Feb. 17, 1959 E. W. WILLIAMS ET AL 2,874,263
PROCESS FOR BUTT WELDING
Filed Oct. 7, 1957
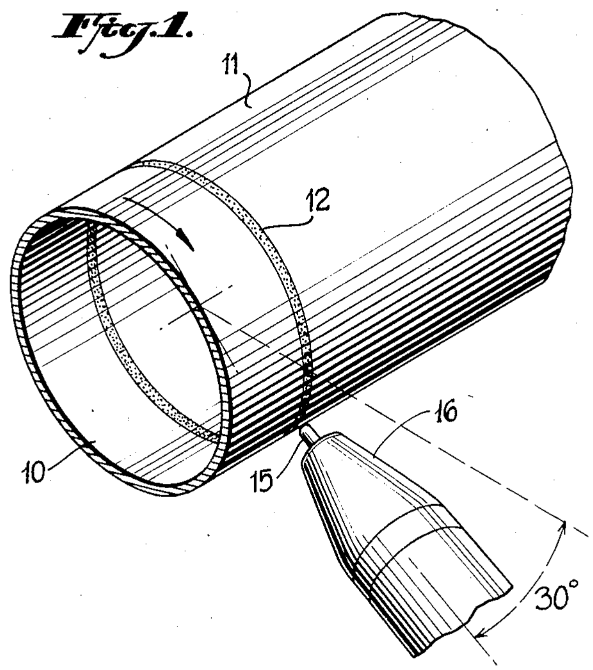
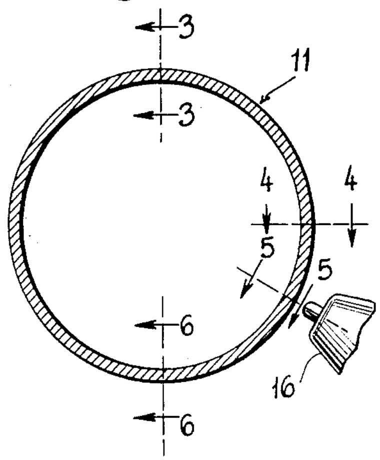
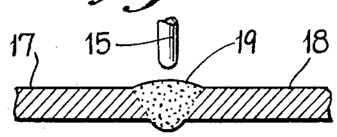
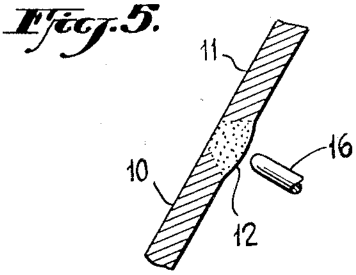
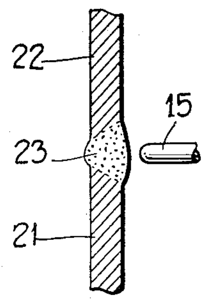
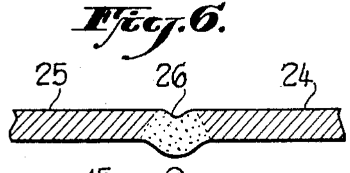
INVENTORS.
ELMER W. WILLIAMS.
HOWARD J. BOWMAN.
BY
Ward, Neal, Haselton, Orme & McElhannon
ATTORNEYS.

United States Patent Office 2,874,263
Patented Feb. 17, 1959

2,874,263

PROCESS FOR BUTT WELDING

Elmer W. Williams, Muskego, and Howard J. Bowman, East Troy, Wis., assignors to Trent Tube Company, East Troy, Wis., a corporation of Wisconsin Application October 7, 1957, Serial No. 688,752

5 Claims. (Cl. 219—61)

This invention relates to an improved method of welding transverse seams in tubing. The invention also relates to such improvements as applied to the contactual, inert-gas-shielded, arc welding of tubing by employment of a non-consumable arc electrode of tungsten or the like.

The conventional method of butt welding metal tubing or welding transverse seams in metal tubing involves positioning the tubing horizontally with the seam to be welded under an arc welding unit mounted above the tubing and carrying an electrode which projects downwardly above the seam. An arc is struck and the tubing is rotated progressively past and beneath the electrode so that the arc melts and fuses together the abutting edges of the seam into a continuous weld joint. During the welding, the arc and the portion of the tubing being welded are enveloped in an inert atmosphere of helium or similar gas fed under pressure from a nozzle surrounding the arc electrode and directed downwardly onto the tubing at the weld point. An inert gas backup on the opposite side of the tube from the arc is also employed so that all of the molten weld metal is under a blanket of inert gas.

The weld produced in this manner has in the tubing interior, a convex, crowned or rib-like formation, projecting radially inward toward the tubing axis and extending along the weld seam, in a more or less irregular fashion. This contour of the weld is apparently due to the action of gravity causing a sagging of the metal rendered molten whereby the convex curvature is imparted to the interior of the weld joint. This crown on the interior of the tubing, if not removed, interferes with the flow of fluid through the finished tubing. Removal of the same is always expensive and frequently satisfactory removal cannot be effected.

The present invention makes possible the welding of transverse seams in tubing without the formation of the above described crown on the tubing interior. By the use of this invention, it is thus possible to produce finished welds which are free from interior crowns and hence which do not interfere with the flow of fluid through the tubing. The invention is especially useful in butt welding metal tubing.

For welding in accordance with this invention, the electrode is positioned adjacent the seam to be welded at a preselected point below the midsection of the tubing. The exact position should be selected so as to obtain the desired smooth interior surface with the inner surface of the weld joint being substantially flush with the inner contour of the tubing. The shape of the inner surface of the weld is dependent on the materials used in the tubing, the thickness of the tube wall, the effect of gravity on the molten weld melt and the surface tension of the molten material, among other factors. In some instances, it is desirable to position the electrode directly beneath the tube so that the tip of the electrode is adjacent the seam at a point 90° below the horizontal midsection of the tubing. Frequently, however, such positioning of the electrode results in a weld having a concavity on its interior surface rather than one having its interior surface flush with the interior of the tubing. In order to avoid such concavity on the interior of the weld, it is preferred with most tubing to position the electrode so that its tip is adjacent the seam at a point about 30 to 60° below the horizontal midsection of the tubing.

In conventional welding practice, where the electrode is above the tubing, outgassing of the tubular stock rendered molten by the arc, in escaping from the upper surface of the weld, flows upward directly against the arc and thus causes the arc to vary its length during the time of gas liberation from the melt. This results in a weld joint of variable width and one which might contain discontinuities due to the variations of heat input resulting from the varying arc length. In contrast to this, when the welding is carried out in accordance with the present invention, the electrode is not disposed above the tubing at the point being welded but to the contrary, is disposed below the horizontal midsection of the tubing, so that such outgassing of the weld joint as occurs on the outer surface of the weld joint, flows upward around the tubing and away from the arc. Outgassing occurring on the interior side of the weld joint obviously has no effect on the arc since it is protected from the arc by the tubing. Welding in accordance with the present invention, therefore, results in an extremely stable arc productive of a uniform weld joint in the tubing interior.

The placement of the electrode below rather than above the point being welded results in a further advantage in relation to the inert gas used to shield the molten weld metal from the atmosphere. In the conventional method of welding with the electrode above the tubing, the inert gas must be directed downwardly against the weld seam since the gas is supplied under pressure from a housing surrounding the arc. As soon as the gas is released, however, it tends to flow upward away from the arc and this makes it more difficult to maintain the arc and weld joint completely shielded at all times from the atmosphere. When the welding is carried on in accordance with the present invention, the arc is disposed below the midsection of the tubing and the inert gas, when released, flows upwardly toward the weld joint and then around the exterior sides of the tubing, thus greatly facilitating the retention of the inert atmosphere enveloping the arc and weld joint.

The present invention is particularly adapted to the welding of tubular stock, the wall thickness of which may be up to ¼ inch. It is also particularly adapted to the welding of various stainless and corrosion resisting steels and alloys such as the various austenitic chromium-nickel steels containing chromium within the range of about 17 to 25% and nickel within the range of about 8 to 35%, both the low carbon grades containing 0.03% carbon maximum and the higher carbon grades containing up to 0.07% carbon maximum or even 0.15%, with and without additions of other elements such as small amounts of columbium, molybdenum, etc. It is also adapted to the welding of the high nickel alloys such as Inconel containing about 15% chromium and 75 to 80% nickel, or Incalloy containing about 20% chromium and 30% nickel, high nickel-chrome-cobalt alloys, such as N–155, S–816, S–590, S–588, etc., also the various grades of Hastalloy, as well as such metals as titanium, zirconium and alloys of each which are highly susceptible to atmospheric contamination and scaling.

Any suitable means may be used to rotate the tubing in accordance with this invention. The tubing may be rotated, for example, by external rolls driving the tubing or may be driven by an expandible chuck. The rotation of the tubing in welding the seam in accordance with this invention should be such that the open seam advances in a downward direction towards the electrode. If the electrode is positioned directly below the tubing, i. e., 90° removed from the horizontal midsection of the tubing, then, of course, the tubing may be rotated in either direction. If, however, as is usually the case in the preferred embodiments of this invention, the electrode is located so that its tip is adjacent the seam at some point between the horizontal midsection of the tubing and the bottom of the tubing, i. e., at some point between 0 and 90° removed from the horizontal in a downward direction, then the direction of rotation is preferably governed by which side of the vertical midsection of the tubing the electrode is positioned on. Since it is desirable to see the open seam from above and since the melt should preferably be solidifying upon itself rather than dropping forward towards the arc, it is preferred to rotate the tubing in such a direction that the open seam advances in a downward direction towards the electrode while the portion of the seam directly beneath the electrode contains solidifying melt.

The effect of gravity on the weld melt may be varied by varying the size of the melt during the welding operation. Increasing the width of the melt, for example, increases the amount and weight of molten metal present at the point of welding and allows gravity to overcome surface tension to a greater degree than when a narrow width of weld melt is formed.

The effect of gravity on the weld melt may also be varied by varying the position at which the electrode is adjacent the seam and therefore the point at which the arc is formed. In this way, for instance, the concavities resulting in the finished weld from having the electrode positioned beneath the tubing in certain instances may be eliminated if the electrode is shifted so that it is adjacent the seam at a point below the horizontal midsection of the tubing but at an angle of less than 90° from the horizontal midsection. The effect of gravity on the weld melt can also be varied to some extent by varying the speed of rotation of the tubing.

The surface tension on the molten weld melt is lower in an inactive gas such as helium or argon than in atmosphere of active gas such as oxygen during the production of an oxide. Some gases, such as $CO_2$ and nitrogen, which are normally inactive may, under the influence of the electric arc and high temperatures, become active to a certain extent. It is generally preferred to blanket the molten weld melt inside and out with inert gases such as helium or argon but more active gases may be used or mixed with the inert gases if it is desired to increase the surface tension of the molten weld melt.

Various, further and more specific objects, features and advantages of this invention will appear from the description taken in connection with the accompanying drawings which form a part of this specification and illustrate by way of example certain embodiments of the invention. The invention consists in such novel features as may be shown and described in connection with the method and apparatus herein disclosed.

In the drawings:

Fig. 1 is a perspective view illustrating an application of this invention in butt welding metal tubing;

Fig. 2 is a view in end elevation of the Fig. 1 showing.

Fig. 3 is a fragmentary view in longitudinal section through the weld joint as taken at 3—3 of Fig. 2 with the welding electrode disposed above the tubing and pointing vertically downward; while Figs. 4–6, inc., are similar views taken, respectively, at 4—4, 5—5 and 6—6 of Fig. 2 with the welding electrode shifted to these positions, respectively.

Referring to Figs. 1 and 2, two sections of tubing 10 and 11 are shown joined by a butt weld 12. The tubing used in producing weld sections as illustrated in Figs. 3–6, inc., was type 304 stainless steel, 5 inches in outside diameter with a wall thickness of 0.134 inch. A tungsten electrode 15 mounted in a housing 16 was employed in welding.

In forming the weld 12, the electrode 15 was first positioned with respect to the tubing as shown in Figs. 1 and 2, and the tubing was rotated so as to bring the seam formed by the abutting ends of the tube components 10, 11, progressively past the electrode 15. During the welding, the electrode was positioned so that its tip was adjacent the seam being welded at a point 30° below the horizontal midsection of the tubing as shown in Figs. 1 and 2, and the tubing was rotated in the direction indicated by the arrow in Fig. 1. Helium under pressure was released from the interior of housing 16 around the electrode 15 in the conventional manner, in order to provide a blanket of inert atmosphere around the arc and molten metal. An atmosphere of helium was also maintained inside the tubing for the same reason.

The weld thus produced is shown in transverse section in Fig. 5, from which it can be seen that the weld 12 has an inner surface which is substantially flush with the inner contour of the tubing.

Fig. 3 shows the weld 19 resulting when tubing sections 17 and 18, which are similar to 10, 11, are butt welded in the manner above described, except for positioning the welding electrode 15, vertically above the tubing so that the tip of the electrode is adjacent to the seam being welded at the uppermost possible point. As can be seen from Fig. 3, the resulting weld 19 has a crowned inner surface which protrudes into the interior of the thus welded tubing. This is the result of butt welding such tubing in accordance with conventional practice.

Fig. 4 shows the weld 23 which results from butt welding tubing sections 21, 22 as aforesaid with the electrode 15 disposed at the horizontal midsection of the tubing. The resulting weld 23, again has a crowned inner surface projecting into the tubing interior.

Fig. 6 shows tubing sections 24 and 25 of the dimensions and material aforesaid, having a butt weld 26 formed by welding with the electrode 15 located directly beneath the tubing so that the tip of the electrode was adjacent to the seam being welded at the lowermost portion of the tubing. As can be seen from Fig. 6, the action of gravity on the weld melt has resulted in a weld 26 having a concave inner surface which is not flush with the inner surface of the tubing.

For providing best results in butt welding of tubing sections according to the invention, the tubing ends to be abutting are square cut or turned flush in a plane perpendicular to the tubing axis.

While the invention has been described in detail with respect to certain embodiments, it will be understood by those skilled in the art that various changes and modifications may be made without departing from the spirit and scope of the invention and it is intended to cover all such changes and modifications in the appended claims.

What is claimed is:

1. The method of butt welding tubing sections by means of an arc electrode to produce a weld joint substantially flush with the tubing interior, which comprises: disposing said sections in substantially horizontal alignment with opposed ends abutting, disposing said arc electrode below the horizontal midsection of said tubing in the plane of said abutting ends, and at an angular position in relation to the horizontal, and concurrently rotating said tubing sections while energizing said electrode to join said abutting tube ends in a fusion weld.

2. The method of butt welding tubing sections by means of an arc electrode to produce a weld joint substantially flush with the tubing interior, which comprises: disposing said sections in substantially horizontal alignment with opposed ends abutting, disposing said arc electrode below the horizontal midsection of said tubing in the plane of said abutting ends, the arc therefrom being radially displaced below the horizontal, and concurrently rotating said tubing sections while energizing said electrode to join said abutting tube ends in a fusion weld.

3. The method of butt welding tubing sections by means of an arc electrode to produce a weld joint substantially flush with the tubing interior, which comprises: disposing said sections in substantially horizontal alignment with opposed ends abutting, disposing said arc electrode below the horizontal midsection of said tubing in the plane of said abutting ends and at an angular position in relation to the horizontal, concurrently rotating said tubing sections to advance the open seam downward toward the electrode while energizing said electrode to join said abutting tube ends in a fusion weld, and during said welding, immersing said arc and the portion of said tubing being welded in an atmosphere of an inert gas both exteriorly and interiorly of the tubing, thereby to prevent atmospheric contamination and scaling of the inner and outer heated surfaces of the tubing.

4. The method of butt welding tubing sections by means of an arc electrode to produce a weld joint substantially flush with the tubing interior, which comprises: imparting square cut ends to sections of tubing to be welded, whereby said ends when abutted will provide a minimum seam, disposing said sections in substantially horizontal alignment with said ends abutting, disposing said arc radially and below the horizontal midsection of said tubing in the plane of said abutting ends and at an angular position in relation to the horizontal, and concurrently rotating said tubing sections while energizing said electrode to join said abutting tube ends in a fusion weld.

5. The method of butt welding tubing sections by means of an arc electrode to produce a weld joint substantially flush with the tubing interior, which comprises: disposing said sections in substantially horizontal alignment with opposed ends abutting, disposing said arc electrode below the horizontal midsection of said tubing in the plane of said abutting ends and at an angular position radially about 30 to 60° below the horizontal, and concurrently rotating said tubing sections while energizing said electrode to join said abutting ends in a fusion weld.

References Cited in the file of this patent

UNITED STATES PATENTS

| | | |
|---|---|---|
| 2,347,914 | Kricker | May 2, 1944 |
| 2,654,014 | Schaefer | Sept. 29, 1953 |